United States Patent
Pritchard et al.

(10) Patent No.: US 9,377,060 B1
(45) Date of Patent: Jun. 28, 2016

(54) BALL RAMP ACTUATOR

(71) Applicant: BorgWarner Inc., Auburn Hills, MI (US)

(72) Inventors: Larry A. Pritchard, Macomb, MI (US); Steven A. Whitaker, Lake Orion, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/740,732

(22) Filed: Jun. 16, 2015

(51) Int. Cl.
| | | |
|---|---|---|
| *F16D 23/12* | (2006.01) | |
| *F16D 27/115* | (2006.01) | |
| *F16D 28/00* | (2006.01) | |
| F16D 13/54 | (2006.01) | |
| F16D 121/24 | (2012.01) | |
| F16D 125/36 | (2012.01) | |

(52) U.S. Cl.
CPC .............. *F16D 23/12* (2013.01); *F16D 27/115* (2013.01); *F16D 28/00* (2013.01); *F16D 13/54* (2013.01); *F16D 2023/123* (2013.01); *F16D 2121/24* (2013.01); *F16D 2125/36* (2013.01)

(58) Field of Classification Search
None
See application file for complete search history.

(56) References Cited

U.S. PATENT DOCUMENTS

| 4,718,303 | A | | 1/1988 | Fogelberg | |
|---|---|---|---|---|---|
| 4,976,347 | A | * | 12/1990 | Sakakibara | ........ B06K 17/3462 180/249 |
| 5,584,776 | A | | 12/1996 | Weilant et al. | |
| 5,915,513 | A | | 6/1999 | Isley, Jr. et al. | |
| 5,943,911 | A | | 8/1999 | Beckerman | |
| 5,966,999 | A | | 10/1999 | Showalter et al. | |
| 2006/0011441 | A1 | * | 1/2006 | Showalter | .......... B60K 17/3467 192/84.6 |
| 2006/0272876 | A1 | * | 12/2006 | Ekonen | .............. B60K 23/0808 180/249 |
| 2007/0056823 | A1 | * | 3/2007 | Ekonen | ................. F16D 27/115 192/35 |
| 2007/0056824 | A1 | * | 3/2007 | Ekonen | ................. F16D 27/115 192/35 |

* cited by examiner

*Primary Examiner* — Rodney H Bonck
(74) *Attorney, Agent, or Firm* — Young Basile Hanlon & MacFarlane P.C.

(57) ABSTRACT

A first ball ramp half includes a first ball ramp plate grounded within a housing against translation that defines first portions of respective one or more ramped ball receiving recesses. A second ball ramp half includes a gear plate supported within the housing for rotation relative to the first ball ramp plate and grounded within the housing against translation relative to the first ball ramp plate that has gear teeth, a second ball ramp plate supported within the housing for rotation relative to the first ball ramp plate that defines complementary second portions of the respective one or more ramped ball receiving recesses, and a joint coupling the gear plate to the second ball ramp plate. The joint imparts rotation of the gear plate to the second ball ramp plate, and is permissive of translation of the second ball ramp plate relative to the first ball ramp plate.

12 Claims, 3 Drawing Sheets

BALL RAMP ACTUATOR

TECHNICAL FIELD

The embodiments disclosed herein generally relate to ball ramp actuators, such as the ball ramp actuators used to actuate friction clutch packs.

BACKGROUND

A typical friction clutch pack includes multiple friction plates interleaved along its axis. The friction clutch pack is actuated by the application of an axial force to the friction plates that compresses the friction plates and clamps them together. With the friction plates clamped together, rotary movement can be transferred through the friction clutch pack via the friction plates.

Ball ramp actuators are commonly used to generate the axial force used for actuating friction clutch packs. A ball ramp actuator includes a ball ramp with two opposing ball ramp halves supported along an axis for relative rotation, load transferring balls positioned in respective ramped ball receiving recesses defined between the two ball ramp halves, and an apply plate coupled to one of the two ball ramp halves.

Typically a ball ramp actuator includes two ball ramp plates that respectively correspond to the two ball ramp halves, with the apply plate coupled to one of the two ball ramp plates. Upon relative rotation of the two ball ramp plates, each load transferring ball climbs its respective ramped ball receiving recess, which axially displaces the two ball ramp plates and generates an axial force at the apply plate. In application, the ball ramp actuator is axially aligned with the friction clutch pack, with the apply plate arranged to actuate the friction clutch pack by applying its axial force to the friction clutch pack's friction plates.

SUMMARY

Disclosed herein are embodiments of a ball ramp actuator. In one aspect, a ball ramp actuator includes a housing, a first ball ramp half and a second ball ramp half opposing the first ball ramp half. The first ball ramp half includes a first ball ramp plate grounded within the housing against translation that defines first portions of respective one or more ramped ball receiving recesses. The second ball ramp half includes a gear plate supported within the housing for rotation relative to the first ball ramp plate and grounded within the housing against translation relative to the first ball ramp plate that has gear teeth, a second ball ramp plate supported within the housing for rotation relative to the first ball ramp plate that defines complementary second portions of the respective one or more ramped ball receiving recesses, and a joint coupling the gear plate to the second ball ramp plate. The joint imparts rotation of the gear plate to the second ball ramp plate, and is permissive of translation of the second ball ramp plate relative to the first ball ramp plate. The ball ramp actuator also includes a load transferring ball positioned in the each of the one or more ramped ball receiving recesses. The ball ramp actuator further includes a driven pinion gear having gear teeth meshed with the gear teeth of the gear plate to rotate the second ball ramp plate via the gear plate relative to the first ball ramp plate.

In another aspect, a ball ramp actuator includes a housing, a first ball ramp half and a second ball ramp half opposing the first ball ramp half. The first ball ramp half includes a disk shaped first ball ramp plate grounded within the housing against translation that defines first portions of respective one or more ramped ball receiving recesses. The second ball ramp half includes an annular gear plate supported within the housing for rotation relative to the first ball ramp plate and grounded within the housing against translation relative to the first ball ramp plate that includes a radially outer edge and a radially inner edge, with the radially inner edge defining a space inside the gear plate and that has external gear teeth at the radially outer edge. The second ball ramp half further includes a disk shaped second ball ramp plate supported within the housing for rotation relative to the first ball ramp plate that includes a radially outer edge that is positioned in the space inside the gear plate with its radially outer edge facing the radially inner edge of the gear plate and that defines complementary second portions of the respective one or more ramped ball receiving recesses. The second ball ramp half also includes a joint coupling the gear plate to the second ball ramp plate. The joint includes a plurality of circumferentially spaced guide slots opening from one of the radially outer edge of the second ball ramp plate and the radially inner edge of the gear plate, and each including opposing radial shoulder surfaces, and a plurality of circumferentially spaced rollers extending from the other of the radially outer edge of the second ball ramp plate and the radially inner edge of the gear plate into respective ones of the one or more guide slots, and each engaging at least one of the opposing radial shoulder surfaces of its respective guide slot in opposition to impart rotation of the gear plate to the second ball ramp plate, and, in rolling translation, to permit translation of the second ball ramp plate relative to the first ball ramp plate. The ball ramp also further includes a load transferring ball positioned in each of the one or more ramped ball receiving recesses. The ball ramp actuator further includes a driven pinion gear having gear teeth meshed with the gear teeth of the gear plate to rotate the second ball ramp plate via the gear plate relative to the first ball ramp plate.

These and other aspects will be described in additional detail below.

BRIEF DESCRIPTION OF THE DRAWINGS

The various features, advantages and other uses of the present apparatus will become more apparent by referring to the following detailed description and drawings in which.

DETAILED DESCRIPTION

This disclosure relates to a configuration of a ball ramp actuator in which one, or both, of the two ball ramp plates respectively corresponding to the two ball ramp halves have gear teeth, and in which the ball ramp actuator further includes a driven pinion gear with gear teeth meshed with the gear teeth of one or both of the two ball ramp plates, as the case may be, to generate the relative rotation of the two ball ramp plates that causes the load transferring balls to climb their respective ramped recesses and ultimately, the axial displacement of the two ball ramp plates.

It will be understood that, with this configuration, where the ball ramp plate that is ultimately axially displaced from the other ball ramp plate has its gear teeth meshed with the gear teeth of the pinion gear, the ball ramp plate's axial displacement occurs under load at the gear mesh interface between the gear teeth of the pinion gear and the gear teeth of the ball ramp plate. This disclosure teaches a similar configuration in which the ball ramp half that would otherwise be represented by such a ball ramp plate has a joint that separates its rotation relative to the other ball ramp plate and its axial displacement from the other ball ramp plate into separate motions.

Figure 1:
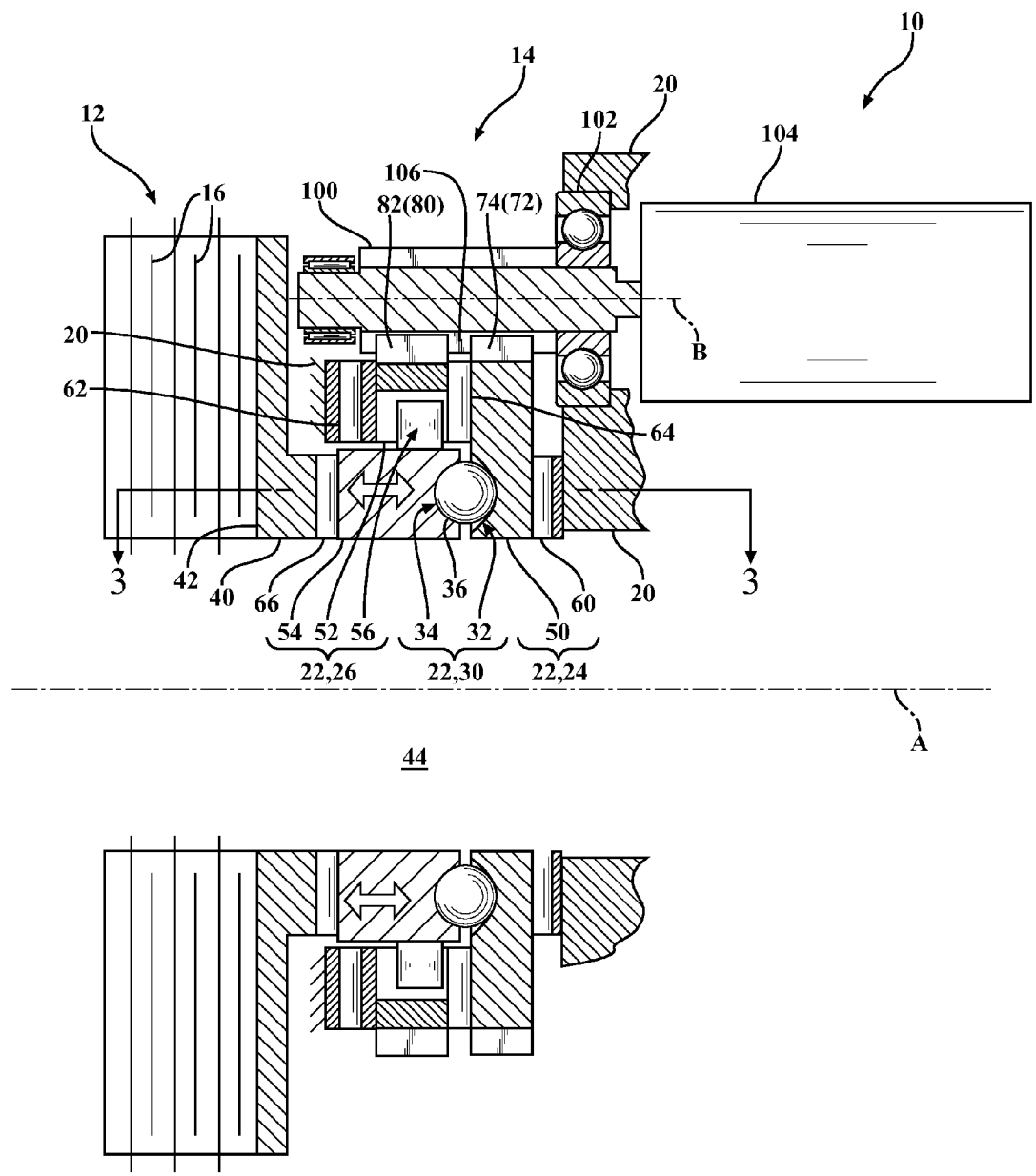
FIG. 1 is a schematic cross sectional view of a friction clutch assembly, showing a friction clutch pack and a ball ramp actuator for actuating the friction clutch pack that includes a ball ramp with two opposing ball ramp halves.
Figure 2:
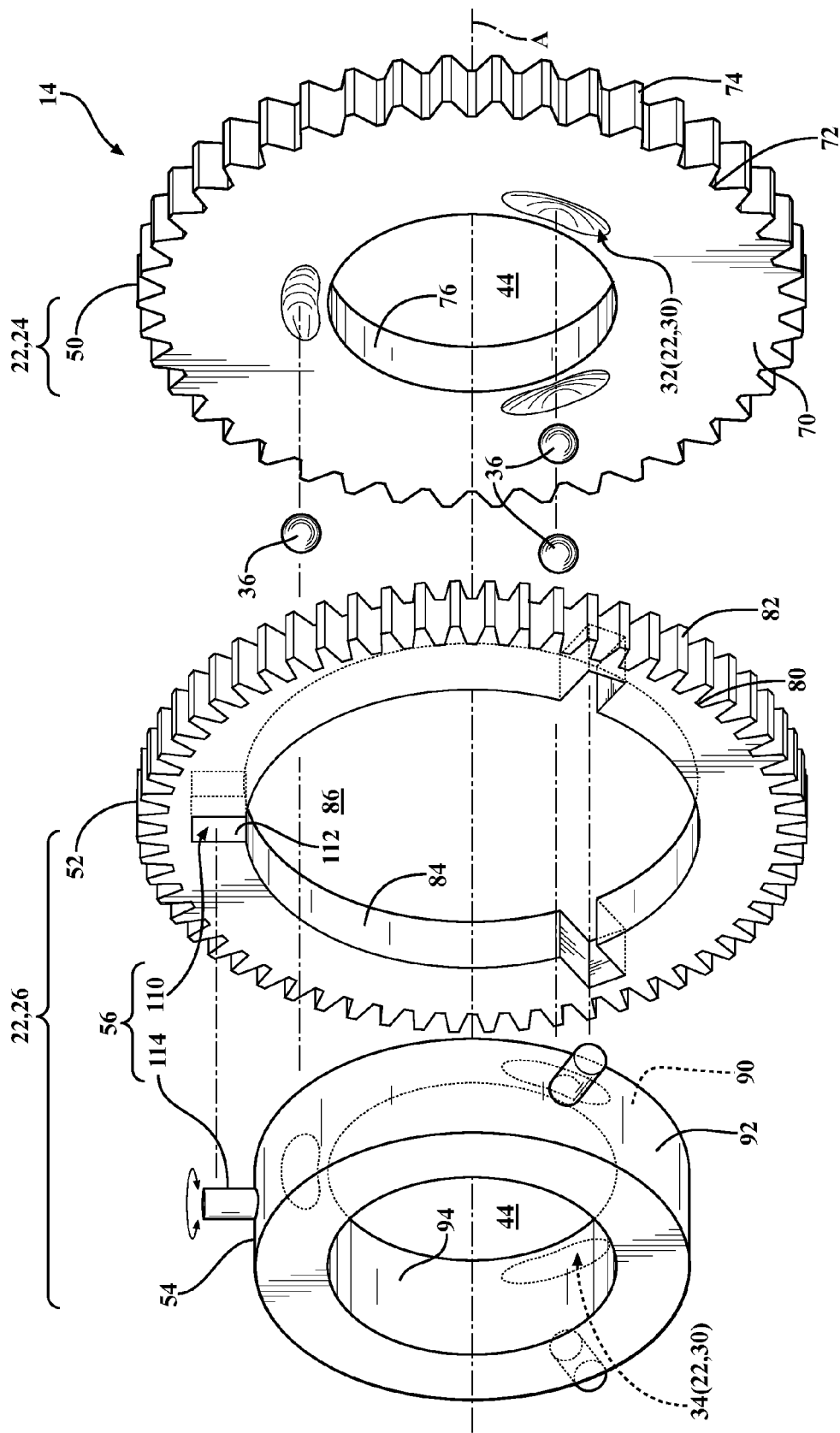
FIG. 2 is a partial assembly view of the ball ramp actuator's ball ramp, showing the two ball ramp halves.

A friction clutch assembly 10 is shown in FIGS. 1 and 2 that includes a friction clutch pack 12 and a ball ramp actuator 14 for actuating the friction clutch pack 12 aligned along a common axis A.

The friction clutch pack 12 includes multiple friction plates 16 interleaved along the axis A. In general, the friction clutch pack 12 is actuated by the application of a force to the friction plates 16 along the axis A that compresses the friction plates 16 and clamps them together. With the friction plates 16 clamped together, rotary movement can be transferred through the friction clutch pack 12 via the friction plates 16.

The ball ramp actuator 14 includes a housing 20, which is represented schematically in FIG. 1, and a ball ramp 22 supported in the housing 20 that generally includes a first ball ramp half 24 and a second ball ramp half 26. As explained in additional detail below, the first ball ramp half 24 and the second ball ramp half 26 of the ball ramp 22 are supported within the housing 20 in an opposed, spaced relationship along the axis A for relative rotation about the axis A, with the first ball ramp half 24 generally grounded within the housing 20 against translation along the axis A, and with the second ball ramp half 26 at least partially permitted to translate relative to the first ball ramp half 24 along the axis A.

Figure 3:
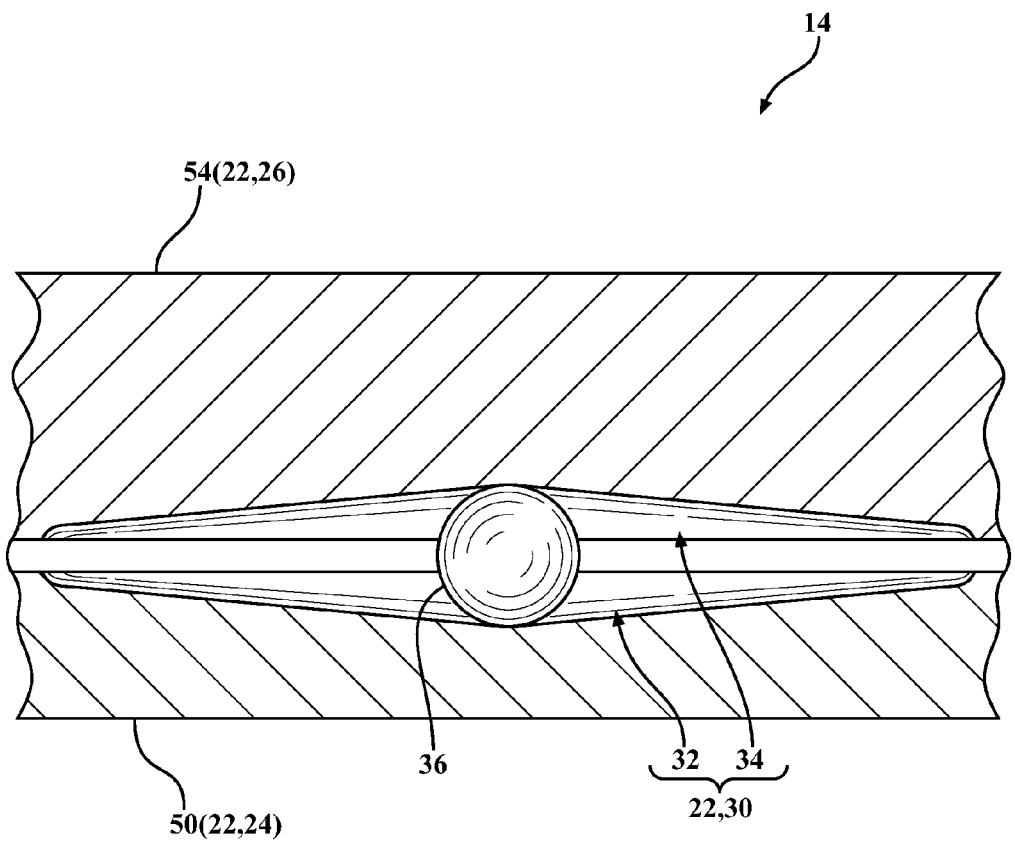
FIG. 3 is a flat pattern development taken along the line 3-3 in FIG. 1, showing ramped recesses defined between the two ball ramp halves and respective load transferring balls positioned in the ramped recesses.

The ball ramp 22 includes one or more ramped ball receiving recesses 30 defined between the first ball ramp half 24 and the second ball ramp half 26. The ball ramp 22 may, for example, include a plurality of ramped ball receiving recesses 30 circumferentially spaced about the axis A. According to the illustrated example, the ball ramp 22 may, for instance, include three ramped ball receiving recesses 30 circumferentially spaced 120 degrees apart about the axis A. Each of the ramped ball receiving recesses 30 has a first portion 32 defined by the first ball ramp half 24 and an axially opposed complementary second portion 34 defined by the second ball ramp half 26. As shown with additional reference to FIG. 3, for each ramped ball receiving recess 30, the first portion 32 defined by the first ball ramp half 24 and the second portion 34 defined by the second ball ramp half 26 can each be shaped as an oblique section of a helical torus, although it will be understood that other shapes could be used for defining the ramped ball receiving recesses 30.

The ball ramp actuator 14 includes a load transferring ball 36 positioned in each of the one or more ramped ball receiving recesses 30 of the ball ramp 22. With the above described configuration of the ramped ball receiving recesses 30, upon relative rotation of the first ball ramp half 24 and the second ball ramp half 26 about the axis A, each load transferring ball 36 climbs its respective ramped ball receiving recess 30, which displaces the second ball ramp half 26 from the first ball ramp half 24 along the axis A.

The ball ramp actuator 14 further includes an apply plate 40 coupled between the second ball ramp half 26 of the ball ramp 22 and the friction plates 16 of the friction clutch pack 12. The apply plate 40 is generally supported for translation along the axis A, and upon relative rotation of the first ball ramp half 24 and the second ball ramp half 26 about the axis A, and the resulting displacement of the second ball ramp half 26 from the first ball ramp half 24 along the axis A as each load transferring ball 36 climbs its respective ramped ball receiving recess 30, a force is generated at the apply plate 40 along the axis A. As shown, the apply plate 40 includes a shoulder 42 opposite the second ball ramp half 26 and arranged to actuate the friction clutch pack 12 by applying the generated force to the friction plates 16.

In one non-limiting example of the friction clutch assembly 10, a common passageway 44 is defined along the axis A through the friction plates 16 of the friction clutch pack 12 and through the first ball ramp half 24, the second ball ramp half 26 and the apply plate 40 of the ball ramp actuator 14. With this configuration, the friction clutch assembly 10 can be applied in a vehicle drive line, for instance in a transfer case or differential, with the common passageway 44 accommodating the output shaft of the transfer case or differential, as generally described in commonly assigned U.S. Pat. No. 6,691,845, which is incorporated herein by reference in its entirety.

In the ball ramp actuator 14, the first ball ramp half 24 includes a first ball ramp plate 50, and the second ball ramp half 26 is aligned with the first ball ramp half and its first ball ramp plate 50 along the axis A and includes an annular gear plate 52, a second ball ramp plate 54 positioned inside the gear plate 52 and a joint 56 coupling the gear plate 52 to the second ball ramp plate 54.

The first ball ramp plate 50 of the first ball ramp half 24 is grounded within the housing 20 against translation along the axis A by a thrust bearing 60 and by a thrust bearing 62 through the gear plate 52 of the second ball ramp half 26 and a thrust bearing 64 permissive of relative rotation between the first ball ramp plate 50 and the gear plate 52. The first ball ramp plate 50 of the first ball ramp half 24 is also optionally supported within the housing 20 for rotation about the axis A.

The gear plate 52 of the second ball ramp half 26 is supported within the housing 20 for rotation about the axis A. The gear plate 52 is grounded within the housing 20 against translation along the axis A by the thrust bearing 62 and by the thrust bearing 60 through the first ball ramp plate 50 of the first ball ramp half 24 and the thrust bearing 64. The second ball ramp plate 54 of the second ball ramp half 26 is supported within the housing 20 for rotation about the axis A and for translation along the axis A relative to, and against, the first ball ramp plate 50. With this translation of the second ball ramp plate 54 along the axis A, a force is generated at the apply plate 40 along the axis A through a thrust bearing 66 permissive of relative rotation between the second ball ramp plate 54 and the apply plate 40, which actuates the friction clutch pack 12, as described above. As described in additional detail below, the joint 56 of the second ball ramp half 26 is configured, among other things, to impart rotation of the gear plate 52 about the axis A to the second ball ramp plate 54, while permitting translation of the second ball ramp plate 54 relative to the gear plate 52 and the first ball ramp plate 50 along the axis A.

As shown best in FIG. 2, the first ball ramp plate 50 of the first ball ramp half 24 is generally disk shaped and includes an inside face 70 and a radially outer edge 72, with the inside face 70 defining the first portions 32 of the one or more ramped ball receiving recesses 30 defined by the first ball ramp half 24. According to the illustrated and non-limiting configuration of the ball ramp actuator 14, the first ball ramp plate 50 has external gear teeth 74 at the radially outer edge 72 with a first pitch. Optionally, the first ball ramp plate 50 can be annular, as generally shown, and additionally include a radially inner edge 76.

The gear plate 52 of the second ball ramp half 26 is generally disk shaped and includes a radially outer edge 80, and has external gear teeth 82 at the radially outer edge 80. As described in additional detail below, in furtherance to the illustrated and non-limiting configuration of the ball ramp actuator 14 where the first ball ramp plate 50 has external gear teeth 74 at the radially outer edge 72 with a first pitch, the external gear teeth 82 at the radially outer edge 80 of the gear plate 52 have a second pitch different from the first pitch. The gear plate 52 is annular, as pointed out above, and includes a radially inner edge 84 defining a space 86 inside the gear plate 52 for accommodating the second ball ramp plate 54 of the second ball ramp half 26. The second ball ramp plate 54 is generally disk shaped and includes an inside face 90 and a radially outer edge 92 facing the radially inner edge 84 of the gear plate 52.

The gear plate 52 and the second ball ramp plate 54 of the second ball ramp half 26 are together generally disk shaped and include the inside face 90 at the second ball ramp plate 54 and the radially outer edge 80 at the gear plate 52, with the inside face 90 defining the second portions 34 of the one or more ramped ball receiving recesses 30 defined by the second ball ramp half 26 and complementary to the first portions 32 of the one or more ramped ball receiving recess 30 defined by the first ball ramp half 24. Optionally, the second ball ramp plate 54 can be annular, as generally shown, and additionally include a radially inner edge 94.

As shown, the profile of the first ball ramp plate 50 that corresponds to the first ball ramp half 24 can generally match the total profile of the gear plate 52 and the second ball ramp plate 54 that together correspond to the second ball ramp half 26. With this configuration of the ball ramp actuator 14, among other things, the common passageway 44 is defined along the axis A in part by the radially inner edge 76 of the first ball ramp plate 50 of the first ball ramp half 24 and in part by the radially inner edge 94 of the second ball ramp plate 54 of the second ball ramp half 26.

Generally speaking, in operation of the ball ramp actuator 14, the second ball ramp half 26 of the ball ramp 22 is rotated about the axis A at a different rotational velocity from the first ball ramp half 24 to generate relative rotation of the first ball ramp half 24 and the second ball ramp half 26 about the axis A.

As shown with additional reference again to FIG. 1, the ball ramp actuator 14 includes a driven pinion gear 100 for rotating the second ball ramp half 26 of the ball ramp 22, and optionally, the first ball ramp half 24 of the ball ramp 22, about the axis A to generate relative rotation of the first ball ramp half 24 and the second ball ramp half 26 about the axis A. The pinion gear 100 is supported in the housing 20 along an axis B parallel to but offset from the axis A for rotation about the axis B at least in part by a bearing 102, and is driven for rotation about the axis B by a rotary actuator 104. The rotary actuator 104 can be an electric motor, for instance.

The pinion gear 100 is generally cylindrically shaped and has external gear teeth 106 at its side arranged to mesh with the external gear teeth 82 at the radially outer edge 80 of the gear plate 52 to rotate the gear plate 52 and, via the joint 56, the second ball ramp plate 54 that together correspond to the second ball ramp half 26 of the ball ramp 22 about the axis A at a rotational velocity. More specifically, when the pinion gear 100 is driven for rotation, the gear plate 52 is rotated about the axis A, the joint 56 imparts the rotation of the gear plate 52 about the axis A to the second ball ramp plate 54, and the gear plate 52 and the second ball ramp plate 54 that together correspond to the second ball ramp half 26 are rotated about the axis A at a rotational velocity.

The rotation of the second ball ramp half 26 of the ball ramp 22 about the axis A at a rotational velocity may generate the relative rotation of the first ball ramp half 24 and the second ball ramp half 26 about the axis A, either alone or in combination with rotation of the first ball ramp half 24 about the axis A at a different rotational velocity than that of the second ball ramp half 26.

As described above, the profile of the first ball ramp plate 50 that corresponds to the first ball ramp half 24 can generally match the total profile of the gear plate 52 and the second ball ramp plate 54 that together correspond to the second ball ramp half 26. With this configuration of the ball ramp actuator 14, among other things, the radially outer edge 72 of the first ball ramp plate 50 of the first ball ramp half 24 generally overlaps the radially outer edge 80 of the gear plate 52 of the second ball ramp half 26 along the axis A, and the pinion gear 100 may be common to both the first ball ramp half 24 and the second ball ramp half 26, with the external gear teeth 106 of the pinion gear 100 additionally arranged to mesh with the external gear teeth 74 at the radially outer edge 72 of the first ball ramp plate 50. In this non-limiting configuration, the external gear teeth 74 at the radially outer edge 72 of the first ball ramp plate 50 have a first pitch, and the external gear teeth 82 at the radially outer edge 80 of the second gear plate 52 have a second pitch different from the first pitch. Therefore, when the pinion gear 100 is driven for rotation, the first ball ramp plate 50 that corresponds to the first ball ramp half 24 is rotated about the axis A at a different rotational velocity than the gear plate 52 and the second ball ramp plate 54 that together correspond to the second ball ramp half 26, which generates the relative rotation of the first ball ramp half 24 and the second ball ramp half 26 about the axis A.

As generally described above, the operation of the ball ramp actuator 14 involves both relative rotation of the first ball ramp half 24 and the second ball ramp half 26 of the ball ramp 22 about the axis A generated at least in part by the rotation of the second ball ramp half 26 about the axis A, and resulting displacement of the second ball ramp half 26 from the first ball ramp half 24 along the axis A as each load transferring ball 36 climbs its respective ramped ball receiving recess 30.

In the ball ramp actuator 14, the joint 56 of the second ball ramp half 26 of the ball ramp 22 is generally configured in collaboration with the annular gear plate 52 and the second ball ramp plate 54 of the second ball ramp half 26 to separate the necessary rotation of the second ball ramp half 26 about the axis A, and its resulting displacement from the first ball ramp half 24 along the axis A, into separate motions. Where the rotation of the second ball ramp half 26 as a whole is generated by the rotation of the pinion gear 100 that has its external gear teeth 106 arranged to mesh with the external gear teeth 82 of the second ball ramp half 26, this configuration of the second ball ramp half 26 advantageously avoids the displacement of the second ball ramp half 26 from the first ball ramp half 24 along the axis A from occurring under load at this gear mesh interface, which would otherwise create friction and result in lost energy.

Both the gear plate 52 and the second ball ramp plate 54 of the second ball ramp half 26 are supported within the housing 20 for rotation about the axis A. However, while the gear plate 52 is grounded within the housing 20 against translation along the axis A, the second ball ramp plate 54 is supported within the housing 20 for translation along the axis A relative to, and against, the first ball ramp plate 50 of the first ball ramp half 24. As the gear plate 52 is rotated about the axis A when the pinion gear 100 is driven for rotation, the joint 56 imparts the rotation of the gear plate 52 about the axis A to the second ball ramp plate 54, which causes the load transferring balls 36 to climb their respective ramped ball receiving recesses 30, while permitting the resulting translation of the second ball ramp plate 54 relative to the gear plate 52 and the first ball ramp plate 50 along the axis A.

In the illustrated and non-limiting example of the gear plate 52, the second ball ramp plate 54, and the joint 56 of the second ball ramp half 26, the joint 56 includes one or more guide slots 110 defining opposed radial shoulder surfaces 112 opening from the radially inner edge 84 of the gear plate 52 and one or more respective axially aligned complementary projections 114 extending from the radially outer edge 92 of the second ball ramp plate 54. The joint 56 may, for example, include a plurality of guide slots 110 and respective complementary projections 114 circumferentially spaced about the axis A. According to the illustrated example, the joint 56 may, for instance, include three guide slots 110 and respective complementary projections 114 circumferentially spaced 120 degrees apart about the axis A, for example, between the three ramped ball receiving recesses 30. It will be understood that alternatively, one or some of all of the guide slots 110 may open from the radially outer edge 92 of the second ball ramp plate 54 with the respective axially opposed complementary projections 114 extending from the radially inner edge 84 of the gear plate 52.

As shown, each projection 114 extends from the radially outer edge 92 of the second ball ramp plate 54 into its respective guide slot 110 in circumferential opposition to the opposed radial shoulder surfaces 112 defined by the guide slot 110. Depending upon the direction of rotation of the gear plate 52 about the axis A, each projection 114 is positioned to engage one or the other of the opposed radial shoulder surfaces 112 defined by its respective guide slot 110 in circumferential opposition to impart the rotation of the gear plate 52 about the axis A to the second ball ramp plate 54. Moreover, each projection 114 is positioned to engage one or both of the opposed radial shoulder surfaces 112 defined by its respective guide slot 110 in translation in order to accommodate and permit the resulting translation of the second ball ramp plate 54 relative to the gear plate 52 and the first ball ramp plate 50 along the axis A. According to the illustrated example, each projection 114 may, for instance, be a generally cylindrical roller positioned to engage one or both of the opposed radial shoulder surfaces 112 defined by its respective guide slot 110 in rolling translation.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A ball ramp actuator, comprising:
    a housing;
    a first ball ramp half including:
        a first ball ramp plate grounded within the housing against translation, the first ball ramp plate defining first portions of respective one or more ramped ball receiving recesses;
    a second ball ramp half opposing the first ball ramp half and including:
        a gear plate supported within the housing for rotation relative to the first ball ramp plate and grounded within the housing against translation relative to the first ball ramp plate, the gear plate having gear teeth,
        a second ball ramp plate supported within the gear plate for rotation relative to the first ball ramp plate, the second ball ramp plate defining complementary second portions of the respective one or more ramped ball receiving recesses, and
        a joint coupling the gear plate to the second ball ramp plate, the joint imparting rotation of the gear plate to the second ball ramp plate, permissive of translation of the second ball ramp plate relative to the first ball ramp plate, including one or more circumferentially spaced guide slots opening from one of a radially outer edge of the second ball ramp plate and a radially inner edge of the gear plate, and including one or more rollers extending from the other of the radially outer edge of the second ball ramp plate and the radially inner edge of the gear plate into respective ones of the one or more guide slots;
    a load transferring ball positioned in the each of the one or more ramped ball receiving recesses; and
    a driven pinion gear having gear teeth meshed with the gear teeth of the gear plate to rotate the second ball ramp plate via the gear plate relative to the first ball ramp plate.

2. The ball ramp actuator of claim 1, wherein:
    the gear plate is annular the radially inner edge of the gear plate defines a space inside the gear plate, and
    the second ball ramp plate is disk shaped, includes a radially outer edge, and is positioned at least partially in the space inside the gear plate with its radially outer edge facing the radially inner edge of the gear plate.

3. The ball ramp actuator of claim 2, wherein:
    each of the one or more guide slots opens from the radially inner edge of the gear plate, and
    each of the one or more rollers extends from the radially outer edge of the second ball ramp plate into a respective one of the one or more guide slots.

4. The ball ramp actuator of claim 2, wherein the gear plate includes a radially outer edge and wherein the gear teeth of the gear plate are external gears at the radially outer edge of the gear plate.

5. The ball ramp actuator of claim 1, wherein:
    each of the one or more guide slots includes opposing radial shoulder surfaces, and
    each of the one or more rollers is positioned to engage at least one of the opposing radial shoulder surfaces of its respective guide slot in opposition to impart rotation of the gear plate to the second ball ramp plate, and in translation to permit translation of the second ball ramp plate relative to the first ball ramp plate.

6. The ball ramp actuator of claim 5, wherein each roller is positioned to engage the at least one of the opposing radial shoulder surfaces of its respective guide slot in rolling translation to permit translation of the second ball ramp plate relative to the first ball ramp plate.

7. The ball ramp actuator of claim 1, wherein:
    the first ball ramp plate is supported within the housing for rotation, and has gear teeth with a first pitch,
    the gear teeth of the gear plate have a second pitch different from the first pitch, and
    the teeth of the pinion gear are meshed with the gear teeth of the first ball ramp plate to rotate the second ball ramp plate via the gear plate at a different rotational velocity than the first ball ramp plate.

8. The ball ramp actuator of claim 7, wherein:
the first ball ramp plate is disk shaped and includes a radially outer edge, with the gear teeth of the first ball ramp plate being external gears at the radially outer edge of the first ball ramp plate, and
the gear plate is disk shaped and includes a radially outer edge, with the gear teeth of the gear plate being external gear teeth at the radially outer edge of the gear plate.

9. The ball ramp actuator of claim 1, further comprising:
an apply plate coupled to the second ball ramp plate.

10. A ball ramp actuator, comprising:
a housing;
a first ball ramp half including:
- a disk shaped first ball ramp plate grounded within the housing against translation, the first ball ramp plate defining first portions of respective one or more ramped ball receiving recesses;

a second ball ramp half opposing the first ball ramp half and including:
- an annular gear plate supported within the housing for rotation relative to the first ball ramp plate and grounded within the housing against translation relative to the first ball ramp plate, the gear plate including a radially outer edge and a radially inner edge, with the radially inner edge defining a space inside the gear plate, and having external gear teeth at the radially outer edge,
- a disk shaped second ball ramp plate supported within the housing for rotation relative to the first ball ramp plate, the second ball ramp plate including a radially outer edge, and positioned at least partially in the space inside the gear plate, with its radially outer edge facing the radially inner edge of the gear plate, and defining complementary second portions of the respective one or more ramped ball receiving recesses, and
- a joint coupling the gear plate to the second ball ramp plate, the joint including a plurality of circumferentially spaced guide slots opening from one of the radially outer edge of the second ball ramp plate and the radially inner edge of the gear plate, and each including opposing radial shoulder surfaces, and a plurality of circumferentially spaced rollers extending from the other of the radially outer edge of the second ball ramp plate and the radially inner edge of the gear plate into respective ones of the one or more guide slots, and each positioned to engage at least one of the opposing radial shoulder surfaces of its respective guide slot in opposition to impart rotation of the gear plate to the second ball ramp plate, and, in rolling translation, to permit translation of the second ball ramp plate relative to the first ball ramp plate;
a load transferring ball positioned in the each of the one or more ramped ball receiving recesses; and
a driven pinion gear having gear teeth meshed with the gear teeth of the gear plate to rotate the second ball ramp plate via the gear plate relative to the first ball ramp plate.

11. The ball ramp actuator of claim 10, wherein:
each of the plurality of guide slots opens from the radially inner edge of the gear plate, and
each of the plurality of rollers extends from the radially outer edge of the second ball ramp plate into respective ones of the one or more guide slots.

12. The ball ramp actuator of claim 10, wherein:
the first ball ramp plate is supported within the housing for rotation, includes a radially outer edge, and has external gear teeth with a first pitch at the radially outer edge,
the gear teeth of the gear plate have a second pitch different from the first pitch, and
the teeth of the pinion gear are meshed with the gear teeth of the first ball ramp to rotate the second ball ramp plate via the gear plate at a different rotational velocity than the first ball ramp plate.

* * * * *